Patented Nov. 6, 1951

2,574,077

UNITED STATES PATENT OFFICE 2,574,077

4,6-DITERTIARY-BUTYL-2-METHYL-CYCLOHEXANOL

Arthur C. Whitaker, Oakmont, and William W. Weinrich, Wallingford, Pa., assignors to Gulf Research & Development Company, Pittsburgh, Pa., a corporation of Delaware No Drawing. Original application May 28, 1945, Serial No. 596,416, now Patent No. 2,505,816, dated May 2, 1950. Divided and this application February 24, 1949, Serial No. 78,224

1 Claim. (Cl. 260—631)

This invention relates to the production of a hydrogenated polyalkylated phenol, and more particularly, it concerns 4,6-di-tertiary-butyl-2-methylcyclohexanol.

This application is a division of our copending application, Serial No. 596,416, filed May 28, 1945, now U. S. Patent 2,505,816, issued May 2, 1950.

Our parent application discloses the production of both 4,6-di-tertiary-butyl-2-methylcyclohexanol and 4,6-di-tertiary-butyl-2-methylcyclohexanone, and processes of producing these compounds.

The primary object of the present invention is to provide, as a new compound, 4,6-di-tertiary-butyl-2-methylcyclohexanol, which is adapted to be utilized as a chemical intermediate in the manufacture of plasticizers, pharmaceuticals, detergents, and antioxidants.

In our above-identified copending application, there is described a method by which 4,6-di-tertiary-butyl-2-methylphenol may be catalytically hydrogenated to convert it into 4,6-di-tertiary-butyl-2-methylcyclohexanol and into 4,6-di-tertiary-butyl-2-methylcyclohexanone. If the phenol is only partially hydrogenated, it is converted into the cyclic ketone, claimed in our copending application, while if it is completely hydrogenated, the phenol is converted into the cyclic alcohol, which is claimed herein. The objects of the present invention are attained by hydrogenating the phenol at a slightly higher temperature and higher initial hydrogen pressure and for a slightly longer time, to obtain the cyclic alcohol rather than the cyclic ketone.

In general, in practicing our invention for the production of 4,6-di-tertiary-butyl-2-methylcyclohexanol by the hydrogenation of 4,6-di-tertiary-butyl-2-methylphenol, we introduce a suitable amount of 4,6-di-tertiary-butyl-2-methylphenol and about 8 to 11 per cent, but preferably about 10 per cent, by weight, of a suitable hydrogenation catalyst, such as Raney or other form of nickel, platinum, or palladium, into a suitable pressure-resistant vessel, such as a rocking bomb, which is then closed and charged with hydrogen to the desired pressure of from about 1500 pounds per square inch of hydrogen to about 2500 pounds per square inch of hydrogen at the height of the reaction. Heat is then applied to the bomb, for example, electrically, and it is brought up to a reaction temperature of about 150° C. to about 250° C. while agitating the reactants. From about one and one-half hours to about two hours are ordinarily required to heat the bomb and its contents to the temperatures specified. The bomb is continuously heated, after the initial reaction temperature has been obtained, for a period of about three and one-half hours for complete hydrogenation.

The completion of the reaction is indicated by a drop in the pressure of the bomb which is equivalent to three moles of hydrogen per mole of polyalkylphenol for complete hydrogenation.

The theoretical pressure drop was calculated as follows:

$$\Delta p = \frac{\text{wt. of sample} \times 82.06 \times T(°K) \times 14.7 \times n}{\text{mol. wt. of sample} \times \left(V - \frac{\text{wt. of sample}}{0.9}\right)}$$

where 82.06 is the gas constant in cc.-atm./mole-degree, 14.7 is p. s. i. per atmosphere, $n$ is the number of moles of hydrogen per mole of phenol which it is desired to add, V is the volume of the bomb and 0.9 is taken as the density of the sample.

After completion of the reaction the bomb is allowed to cool and its contents are removed and filtered to separate the catalyst from the hydrogenation product. The hydrogenation products may then be purified in any desired manner to separate them from the initial starting materials, such as by fractionation.

Because of the practical absence of side reactions, variations in operating conditions apparently have little influence on the character of the product when complete hydrogenation is desired; only the rate of reaction is altered.

It will be understood that the degree of hydrogenation is not destructive, i. e. the hydrogenation is not carried on to the extent that the OH group is reduced to give a hydrocarbon nor are the rings opened nor any groups removed.

It will be further understood that the temperature necessary to carry on a relatively mild hydrogenation is dependent upon the pressure, and the higher the operating pressure, the lower the temperature required to effect hydrogenation. The initial pressure is not as important as the pressure on the material when heated or the pressure at the end of the reaction. There must be sufficient hydrogen present at the end of the reaction to insure completion of the degree of hydrogenation desired, the final excess of hydrogen being indicated by the pressure of hydrogen present at that stage.

For complete hydrogenation, the reaction begins at about 160° C. and at a pressure of about 2200 pounds per square inch and is complete at a temperature of about 215° C. and at a pressure of about 2060 pounds per square inch. Fields obtained by our method aproach the theoretical values.

The following specific example will serve to illustrate our invention:

Sixty parts of 4,6-di-tertiary-butyl-2-methylphenol, 6 parts of Raney nickel catalyst, and 1510 pounds per square inch of hydrogen were charged to a 1500 ml. rocking bomb. The bomb was electrically heated for a period of about two hours until a reaction temperature of about 185° C. and a pressure of about 2250 pounds per square inch of hydrogen were attained. The reaction was completed after the heating had been continued for a further period of about three and one-half hours, and when a temperature of about 220° C. and a final pressure of about 2100 pounds per square inch had been attained. Pressure drop was most rapid at a temperature of 200° C. and a pressure of about 2200 pounds per square inch. After cooling the bomb overnight, the contents thereof were discharged and filtered, and the hydrogenation product thus obtained, after rectification, had the following properties:

|  | B. P. | Per Cent C | Per Cent H |
|---|---|---|---|
| Calculated | | 79.64 | 13.27 |
| Found | 142.4° C./20 mm | 79.37 | 13.22 |

The compound of the present invention is adapted to be employed as a chemical intermediate in the manufacture of pharmaceuticals, plasticizers, detergents, and as antioxidants. The compound is particularly useful as a plasticizer for casein, melamine, ethyl cellulose and cellulose nitrate plastics where clarity and light stability are desirable features.

The compound of this invention may be represented by the following formula:

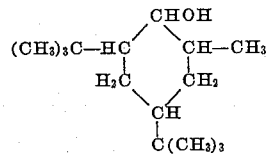

Resort may be had to such modifications and variations as fall within the spirit of the invention and the scope of the appended claim.

What we claim is:

As a new product, the compound 4,6-di-tertiary-butyl-2-methylcyclohexanol.

ARTHUR C. WHITAKER.
WILLIAM W. WEINRICH.

REFERENCES CITED

The following references are of record in the file of this patent:

UNITED STATES PATENTS

| Number | Name | Date |
|---|---|---|
| 2,087,691 | Lazier | July 20, 1937 |
| 2,433,008 | Whitaker et al. | Dec. 23, 1947 |